United States Patent [19]

Raidel

[11] Patent Number: 4,763,923
[45] Date of Patent: Aug. 16, 1988

[54] SUSPENSION ASSEMBLY WITH AIR SPRING AND SELF CONTAINED AIR LIFT SPRING

[76] Inventor: John E. Raidel, Rte. 1, Box 400-M, Springfield, Mo. 65804

[21] Appl. No.: 20,399

[22] Filed: Mar. 2, 1987

[51] Int. Cl.$^4$ ............................................. B60G 11/56
[52] U.S. Cl. .................................................. 280/704
[58] Field of Search ....................... 280/704, 688, 683

[56] References Cited

U.S. PATENT DOCUMENTS

| | | | |
|---|---|---|---|
| 3,794,344 | 2/1974 | Raidel | 280/704 |
| 4,166,639 | 9/1979 | Taylor | 280/704 |
| 4,171,830 | 10/1979 | Metz | 280/704 |
| 4,293,145 | 10/1981 | Taylor | 280/704 |
| 4,504,080 | 3/1985 | Van Denberg | 280/704 |
| 4,684,142 | 8/1987 | Christenson | 280/704 |

Primary Examiner—Ross Weaver
Attorney, Agent, or Firm—Rogers, Howell, Moore & Haferkamp

[57] ABSTRACT

A suspension system having a self-contained air lift spring located within the confines of a hanger. A torque beam and axle seat assembly is pivotally supported by the hanger. An axle load air spring is mounted between the torque beam and axle seat assembly and the chassis. The air lift spring is mounted between a fixed wall on the hanger and a movable wall connected to the torque rod and axle seat assembly. The fixed wall is generally vertical and the movable wall projects upwardly with the axis of the lift air spring being generally horizontal.

6 Claims, 2 Drawing Sheets

SUSPENSION ASSEMBLY WITH AIR SPRING AND SELF CONTAINED AIR LIFT SPRING

BACKGROUND AND SUMMARY OF THE INVENTION

This invention relates to a suspension system and particularly to a compact suspension system incorporating an air spring and an air lift spring self contained within a hanger.

The invention incorporates a highly compact group of components that includes a self contained air lift spring. A hanger that depends downwardly from the chassis side rail supports an eccentric bolt and bushing assembly to which a torque rod and axle seat assembly is journalled. The torque rod and axle seat assembly includes an axle seat that is connected underslung to an axle that is a trailing or pusher axle. An air spring is mounted between the axle seat and a bracket that is connected to the side rail. The torque rod and axle seat are connected together by two bushing assemblies to create an overall flexing beam.

A special movable wall is made integral with and projects upwardly from the torque beam so that it revolves about the eccentric bolt and bushing assembly as the torque beam swings with up and down movements of the axle. The movable wall revolves relative to a stationary wall that is supported by the hanger. The hanger is further specially formed to provide a large pocket in the area between the movable wall and the stationary wall to accommodate the mounting of a lift air spring between those two walls.

To further conserve space as required for the compact suspension system of this invention, the lift air spring is mounted on a generally horizontal axis made possible because the stationary plate is substantially vertical and the movable plate projects generally upwardly at an angle to the substantially vertical fixed plate.

The axle load spring has an internal bumper that limits the upward movement of the axle caused by operating forces. The air lift spring has an internal bumper that limits the downward movement of the axle caused by downward operating forces. When inflated, the air lift spring lifts the axle, such as is desired when the vehicle is not loaded.

DESCRIPTION OF THE PREFERRED EMBODIMENT

Figure 2:
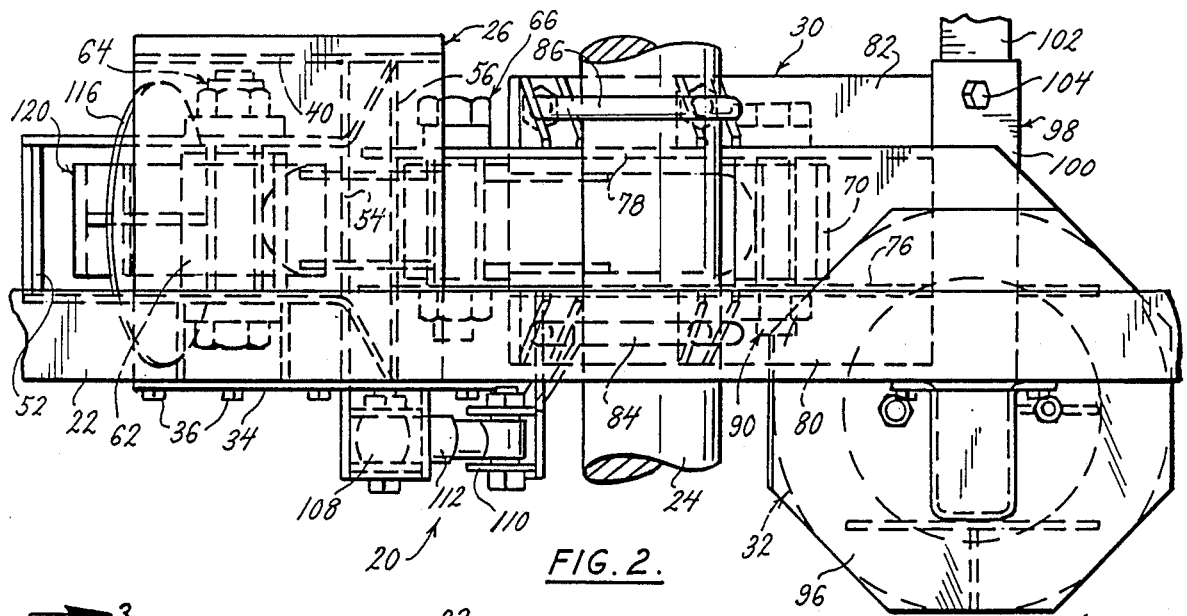
FIG. 2 is a top plan view of the suspension system.

The suspension system 20 is installed on a vehicle having a chassis side rail 22 and an axle 24, which is a pusher or trailing axle. The general components of the suspension system 20 include a hanger assembly 26 that incorporates a lift air spring 28, a torque beam and axle seat assembly 30, and an air spring 32. The air lift spring 28 and the air spring 32 are the kind having internal bumpers, as known. The hanger assembly 26 includes a bracket section 34 connected by a plurality of bolts 36 to the chassis side rail 22.

Figure 1:
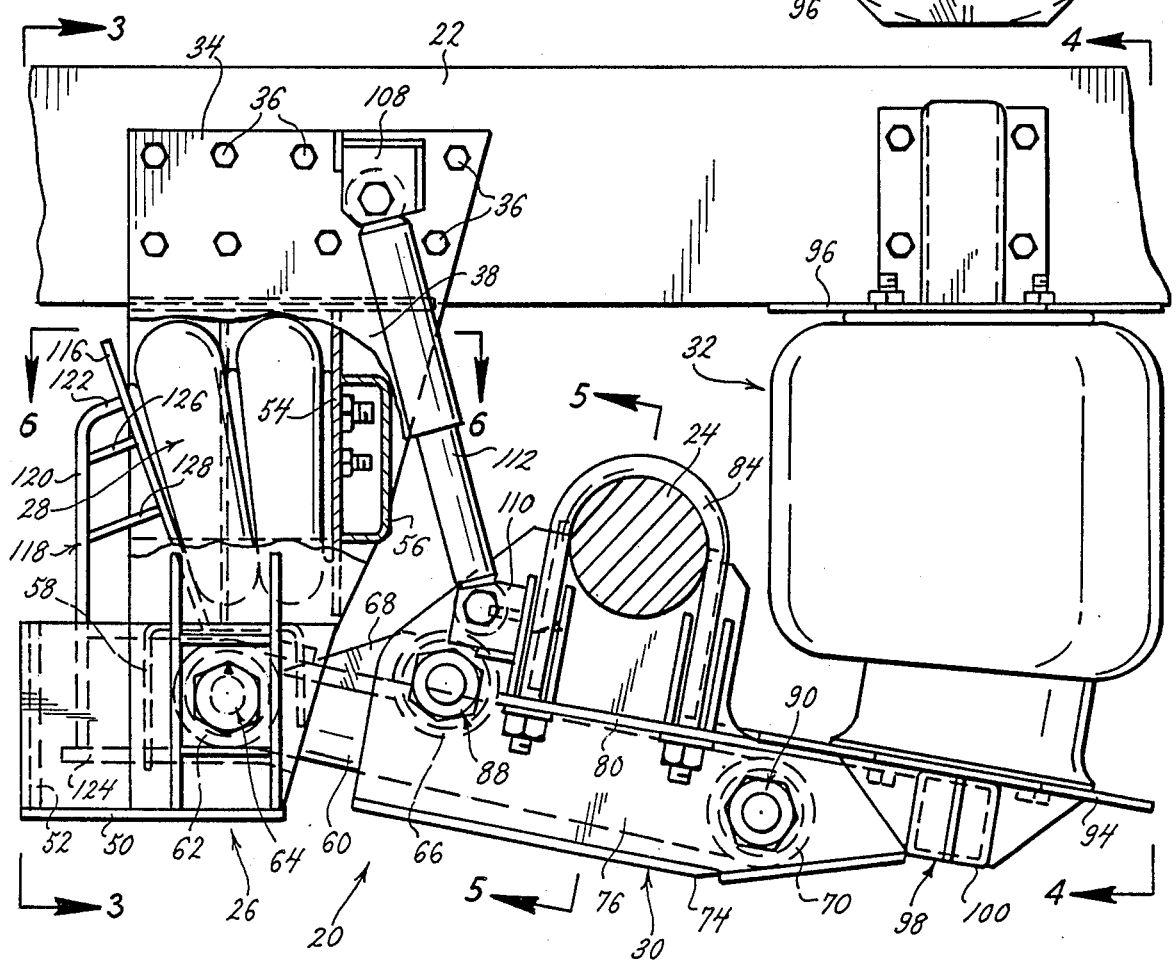
FIG. 1 is a side elevation view of the suspension system.
Figures 3, 4:
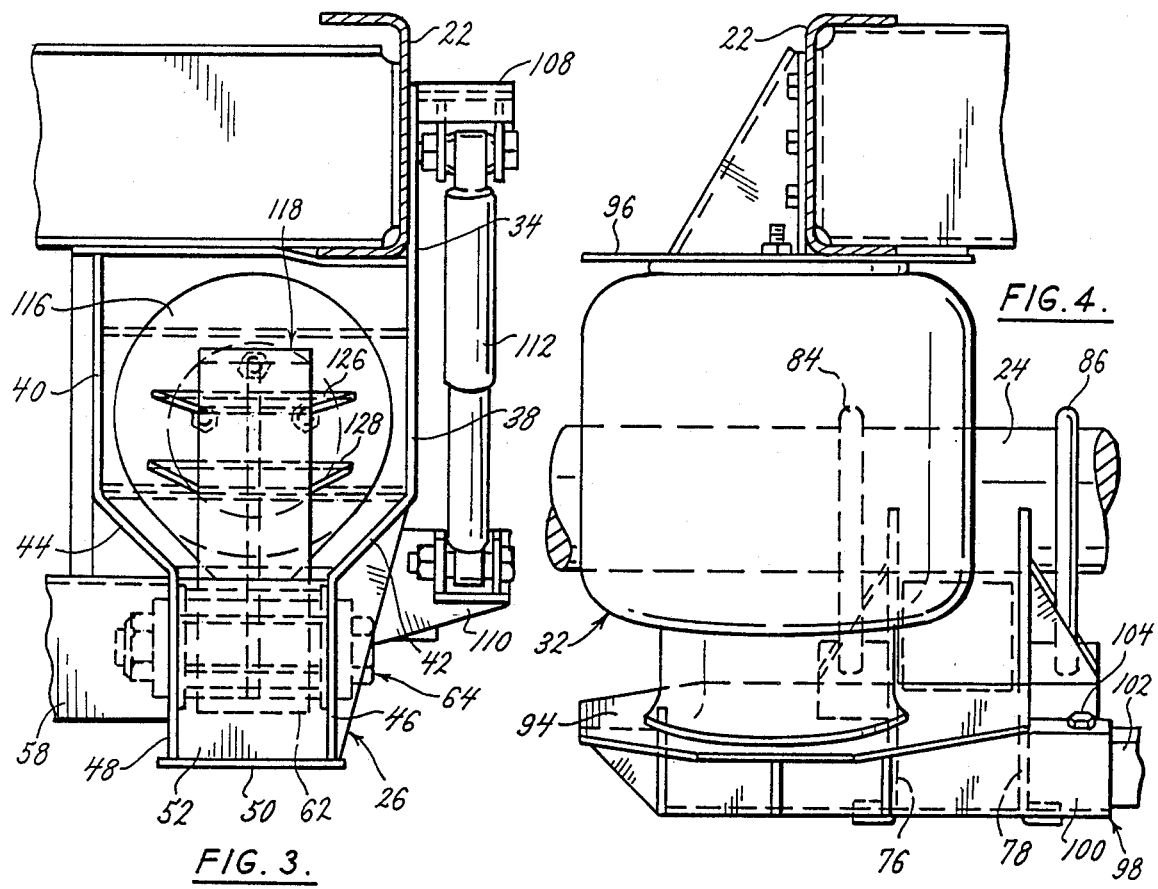
FIG. 3 is a front elevation view of the suspension system as viewed along the plane of the line 3—3 of FIG. 1.
FIG. 4 is a rear elevation view of the suspension system as viewed along the plane of the line 4—4 of FIG. 1.
Figures 5, 6:
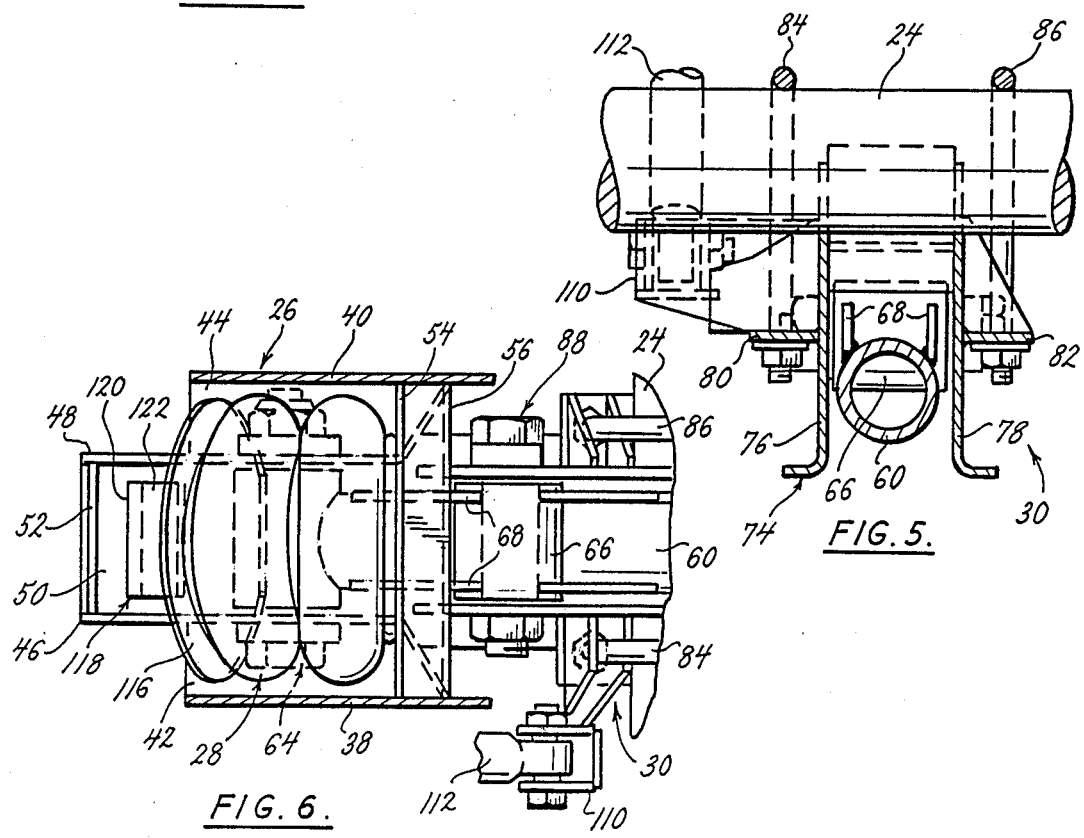
FIG. 5 is a view in section taken along the plane of the line 5—5 of FIG. 1.
FIG. 6 is a view in section taken along the plane of the line 6—6 of FIG. 1.

Projecting below the bracket section are a pair of spaced vertical plates 38 and 40. The plates 38 and 40 are spaced apart sufficiently to allow the air lift spring 28 to fit between them. Yet, as shown in FIGS. 2 and 3, the outboard vertical plate 38 is aligned with the outboard side of the side rail 22. This provides a slim skirt with a narrow profile. Consequently, the lift spring of a suspension system for a drive axle (not shown) can occupy an area immediately outboard of the vertical plate 38. Below the area occupied by the air lift spring 28, there are inwardly inclined wall sections 42 and 44 leading to horizontal plate sections 46 and 48. As shown in FIGS. 1 and 6, the lower plate sections 46 and 48 project forwardly of the rest of the hanger assembly 26 and are reinforced by a bottom plate 50 welded to the lower edges of the plate sections 46 and 48 and a by front plate 52 welded between the forward edges of the plate sections 46 and 48 and to the bottom plate 50.

A vertical wall 54 is welded between the wider hanger plates 38 and 40. The vertical wall 54 is reinforced by a channel member 56 that is also welded to the side walls 38 and 40 as well as to the vertical wall 54. As a result, the vertical wall 54 is rigid.

To provide stabilization of the hanger assembly 26, an inverted channel member 58 is welded to the inner surface of the plate 48 and extends transversely across the vehicle where its opposite end is welded to a like hanger assembly on the opposite side of the vehicle. The channel member 58 is heavy and functions as a bolster beam to compensate for the fact the chassis may have no cross members between the side rails 22 in the area of the hanger assembly 26.

The torque beam and axle seat assembly 30 includes a tubular torque rod 60 having a transverse sleeve 62 welded to its forward end. The transverse sleeve 62 forms the outer housing of an eccentric bolt and bushing assembly 64 of a construction and function known in the art. The eccentric bolt and bushing assembly 64, including the forward end of the torque beam 60, is mounted between the lower side plate sections 46 and 48 of the hanger assembly 26.

There is another transverse sleeve 66 welded to the torque beam 60 with plates 68 for reinforcing the sleeve 66. A third transverse sleeve 70 is welded to the rearward end of the torque beam 60. These sleeves 66 and 70 form outer bushing housings.

The torque beam and axle seat assembly 30 also includes an axle seat 74 formed by two plates 76 and 78. Appropriately braced lateral flanges 80 and 82 allow the axle seat 74 to be connected to the axle 24 by a pair of U-bolts 84 and 86.

The sleeves 66 and 70 of the torque beam 60 function as outer housings for two bushing assemblies 88 and 90 that are mounted between the two plates 76 and 78 of the axle seat 74. The two bushing assemblies 88 and 90 provide a flexing beam effect of the torque beam and axle seat assembly 30.

At the rearward end of the axle seat 74, a plate 94 is supported. The air spring 32 is mounted between the plate 94 and a bracket 96 that is bolted to the chassis side rail 22. A bolster beam 98 extends between the axle seat 74 and a similar axle seat on the opposite side of the vehicle. The bolster beam 98 is located immediately below the air spring 32, as shown in FIG. 1. The bolster beam 98 comprises two sections 100 and 102 telescoped together to provide length adjustment capability. This compensates for variations in widths of different vehicle frames. After the length has been adjusted as necessary, the two sections 100 and 102 are locked together by a bolt 104.

As shown particularly in FIGS. 1 and 3, an upper shock absorber bracket 108 depends outwardly from the hanger plate 34. A lower shock absorber bracket 110 projects outwardly from the axle seat 74. A shock absorber 112 is mounted between the brackets 108 and 110.

A lift spring plate 116 is supported on a frame 118 that is joined to the torque beam 60. The air lift spring 28 is mounted between the lift spring plate 116 and the vertical wall 54. The frame 118 includes a generally vertical section 120 that has a bent upper end 122 welded to the spring seat plate 116 and a lower end that is welded to a generally horizontal plate 124. The plate 124 is welded to the torque beam 60. There are additional reinforcing plates 126 and 128 welded between the vertical member 120 and the lift spring plate 116.

Operation

In the operation of this suspension system 20, the torque beam 60 and axle seat 74, joined by the bushing assemblies 88 and 90, combine to act as a flexing bolster beam and axle seat assembly. Loads applied vertically to the axle 24 cause the axle to move up and down relative to the chassis side rail 22. This pivots the torque beam and axle seat assembly 30 about the eccentric bolt and bushing assembly 64 as dampened by the air spring 32.

The minimum clearance between the axle 24 and the chassis side rail 22, resulting from upward movement of the axle 24, is established by the internal bumper of the air spring 32. As the torque beam and axle seat assembly 30 swings downwardly with downward movement of the axle 24, the movable wall 116 is revolved toward the fixed wall 54, compressing the lift air spring 28. The internal bumper of the lift air spring 28 sets the limit of clockwise swinging movement of the torque beam and axle seat assembly 74 and therefore sets the limit of downward movement of the axle 24.

When the vehicle is not loaded, or it is otherwise desired to lift the axle 24, the lift air spring is inflated. This allows the movable wall 116 to revolve about the eccentric bolt and bushing assembly 64 in a counterclockwise direction to swing the torque beam and axle seat assembly 30 and lift the axle 24.

The compactness of the suspension system 20 is accomplished by the unique construction of the hanger assembly 26 that allows the lift air spring 28 to be contained within the hanger assembly. The fixed wall 54 being supported at the rearward side of the hanger assembly and the movable wall 116 being located near the forward side of the hanger assembly allows the lift air spring 28 to be positioned within the hanger assembly. This avoids elongation of the suspension system as would otherwise would be required to accommodate a lift air spring.

Since the side plate or skirt 38 is generally in line with the frame side rail 22, the skirt 38 presents a narrow profile. This avoids interference of the skirt 38 with the leaf springs or other components of a suspension system (not shown) that would be associated with a steer axle. These leaf springs or other components (such as a shackle) can be positioned in an area directly outboard of the skirt 38.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A suspension system system for a vehicle having a chassis and an axle, comprising a hanger assembly, means to connect the hanger assembly to the chassis, the hanger assembly having spaced lower plate portions with forward extensions thereon and a cross member connected between the forward extensions, a bushing assembly supported between the two plate portions, a torque beam assembly having a forward end journalled on the bushing assembly to allow the torque beam assembly to swing aabout the bushing assembly, means for connecting the torque beam assembly to the axle, an air spring connected between the torque beam assembly and the chassis, a generally vertical fixed wall supported by the hanger assembly above the lower plate portions, the fixed wall being wider than the span between the lower plate portions, two spaced plate sections above the lower plate portions, the space between the plate sections being greater than the space between the plate portions, the fixed wall being connected between the plate sections, means for connecting the plate sections to the respective plate portions, a movable wall supported by and extending upwardly from the torque beam assembly and mobable between the plate sections relative to the fixed wall when the torque beam assembly swings about the bushing assembly, and a lift air spring mounted on a generally horizontal axis between the fixed and movable walls in the area between the plate sections.

2. The suspension system of claim 1 wherein the torque beam and axle seat assembly includes a torque beam and an axle seat connected together by two bushing assemblies.

3. The suspension system of claim 2 wherein one bushing assembly is forward of the axle and the other bushing assembly is rearward of the axle.

4. The suspension system of claim 3 wherein the axle seat is underslung relative to the axle.

5. The suspension system of claim 1 wherein the movable wall is reinforced by a frame connected to the torque beam assembly and the movable wall and projecting into the space between the forward extensions of the plate portions and between the bushing assembly and the cross members.

6. The suspension system of claim 1 including a bolster beam connected between the hanger assembly and a like hanger assembly on the opposite side of the vehicle.

* * * * *